US010967883B2

(12) United States Patent
Miller et al.

(10) Patent No.: US 10,967,883 B2
(45) Date of Patent: Apr. 6, 2021

(54) METHODS AND SYSTEMS FOR ADJUSTING VEHICLE NOISE FOR HUMAN-IN-THE-LOOP CRUISE CONTROL

(71) Applicant: Ford Global Technologies, LLC, Dearborn, MI (US)

(72) Inventors: Kenneth Miller, Canton, MI (US); Thomas Leone, Ypsilanti, MI (US); Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 379 days.

(21) Appl. No.: 15/945,427

(22) Filed: Apr. 4, 2018

(65) Prior Publication Data

US 2019/0308640 A1 Oct. 10, 2019

(51) Int. Cl.
| *B60W 50/14* | (2020.01) |
| *B60W 20/15* | (2016.01) |
| *B60W 10/10* | (2012.01) |
| *F02D 41/00* | (2006.01) |
| *F02P 5/04* | (2006.01) |
| *F02D 13/02* | (2006.01) |
| *B60W 20/17* | (2016.01) |

(52) U.S. Cl.
CPC ............ *B60W 50/14* (2013.01); *B60W 10/10* (2013.01); *B60W 20/15* (2016.01); *B60W 20/17* (2016.01); *F02D 13/0234* (2013.01); *F02D 41/0002* (2013.01); *F02P 5/045* (2013.01); *B60W 2520/10* (2013.01); *B60W 2720/30* (2013.01)

(58) Field of Classification Search
CPC ...... B60W 50/14; B60W 20/17; B60W 20/15; B60W 10/10; B60W 2720/30; B60W 2520/10; F02D 41/0002; F02D 13/0234; F02P 5/045
See application file for complete search history.

(56) References Cited

U.S. PATENT DOCUMENTS

| 6,690,291 | B1 | 2/2004 | Cardillo et al. |
| 8,633,812 | B2 | 1/2014 | Harumoto et al. |
| 8,784,267 | B2* | 7/2014 | Staudinger et al. ........................ B60W 2520/10 701/93 |
| 2005/0083189 | A1 | 4/2005 | Wang |
| 2009/0254259 | A1* | 10/2009 | The ........................ G01S 19/52 701/70 |
| 2010/0042281 | A1 | 2/2010 | Filla |
| 2011/0082618 | A1 | 4/2011 | Small et al. |
| 2012/0257763 | A1* | 10/2012 | Bowden et al. ..... G10K 11/178 381/71.4 |
| 2014/0119567 | A1 | 5/2014 | DeLine et al. |

(Continued)

FOREIGN PATENT DOCUMENTS

WO 2010052236 A1 5/2010

*Primary Examiner* — Dale W Hilgendorf
(74) *Attorney, Agent, or Firm* — Geoffrey Brumbaugh; McCoy Russell LLP

(57) ABSTRACT

Methods and systems are provided for adjusting vehicle noises to notify the vehicle operator of speed changes in human-in-the-loop cruise control and semi-autonomous vehicle operation. In one example, a method for drive unit of a vehicle may include responsive to a vehicle speed meeting a predefined condition relative to a threshold vehicle speed, adjusting one or more drive unit actuators to modulate engine noise while maintaining desired wheel torque within a threshold.

20 Claims, 7 Drawing Sheets

(56) References Cited

U.S. PATENT DOCUMENTS

| | | |
|---|---|---|
| 2016/0250985 A1 | 9/2016 | Ricci |
| 2017/0144664 A1* | 5/2017 | Yamashita et al. ... B60W 50/14 |
| 2018/0105158 A1* | 4/2018 | Nannuduri et al. .. B60W 20/15 |
| 2019/0111841 A1* | 4/2019 | Yamanashi et al. ........................ B60W 2520/10 |

* cited by examiner

METHODS AND SYSTEMS FOR ADJUSTING VEHICLE NOISE FOR HUMAN-IN-THE-LOOP CRUISE CONTROL

FIELD

The present description relates generally to methods and systems for a vehicle, and more specifically to methods and systems for adjusting vehicle noise to notify the vehicle operator of speed changes during human-in-the-loop cruise control and semi-autonomous operation.

BACKGROUND/SUMMARY

Cruise control systems are frequently provided in motor vehicles to allow an operator to set an upper limit for vehicle speed, thereby allowing the operator to avoid exceeding jurisdiction-set road speed limits if desired. However, during actual vehicle operation, situations may arise that require the operator to modulate speed to avoid accidents or otherwise maintain vehicle safety and traffic flow. Thus, rather than rely on cruise control, some vehicle operators prefer to maintain control of the vehicle speed using the accelerator pedal and vehicle brake, thereby negating the benefits of cruise control.

Various approaches have been proposed for notifying a vehicle operator that the vehicle is exceeding a speed limit, to allow the operator to control vehicle speed while reducing the likelihood of exceeding speed limits. One example approach is disclosed in U.S. Pat. No. 6,690,291. Therein, current vehicle speed is compared to a speed limit for the road the vehicle is traveling on, and if the vehicle speed exceeds the speed limit, an operator of the vehicle is notified via an audio or visual warning, such as a beeping noise or flashing light.

However, the inventors herein have recognized an issue with the above approach. While intrusive audio or visual signals such as those described above may be beneficial during the hazardous or emergency situations described in U.S. Pat. No. 6,690,291, during more typical vehicle operation, an operator may become distracted by beeping noises or flashing lights. Further, some driving situations may dictate prolonged excursions at speeds above a preset speed and/or may include operation at speeds minimally above the preset speed. Continual beeping noises or flashing lights during such situations may irritate the operator of the vehicle, resulting in such warning systems being disabled, thereby minimizing their usefulness. Furthermore, the approach described above provides no warning at speeds minimally below the preset speed, so a problem is that the driver may want a subtle non-distracting notice when nearing the preset speed that also gives the driver an indication of quantity of speed from the threshold and the rate of approach to the threshold.

Accordingly, the inventors herein propose an approach to at least partly address the above issues. In one example, a method for drive unit of a vehicle includes, responsive to a vehicle speed meeting a predefined condition relative to a threshold vehicle speed, adjusting one or more drive unit actuators to modulate noise while maintaining desired wheel torque within a threshold. In this way, an operator of a vehicle may be notified of impending or occurring vehicle speed deviations without the use of distracting or irritating audio or visual notifications. In one example, the drive unit may include an engine, and engine noise may be modulated by adjusting one or more actuators of the engine to increase engine noise based on a speed error (e.g., a difference between an actual vehicle speed and a target speed), in a linear or non-linear manner. The one or more actuators may include intake valves, exhaust valves, intake throttle, turbocharger valves (e.g., a wastegate and/or compressor bypass valve), and transmission gear. Engine and/or wheel torque may be maintained by making compensating adjustments to one or more other engine actuators. For example, intake throttle position may be adjusted to increase engine noise and cylinder intake valve timing may be adjusted to maintain torque. Further, the actuator(s) selected for adjustment may be based on fuel economy. For example, the adjustment that results in the best fuel economy or smallest change in fuel economy may be selected. By doing so, an operator of a vehicle may be notified of current vehicle speed relative to a set speed using non-intrusive engine noise adjustments that do not significantly affect torque or fuel economy.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
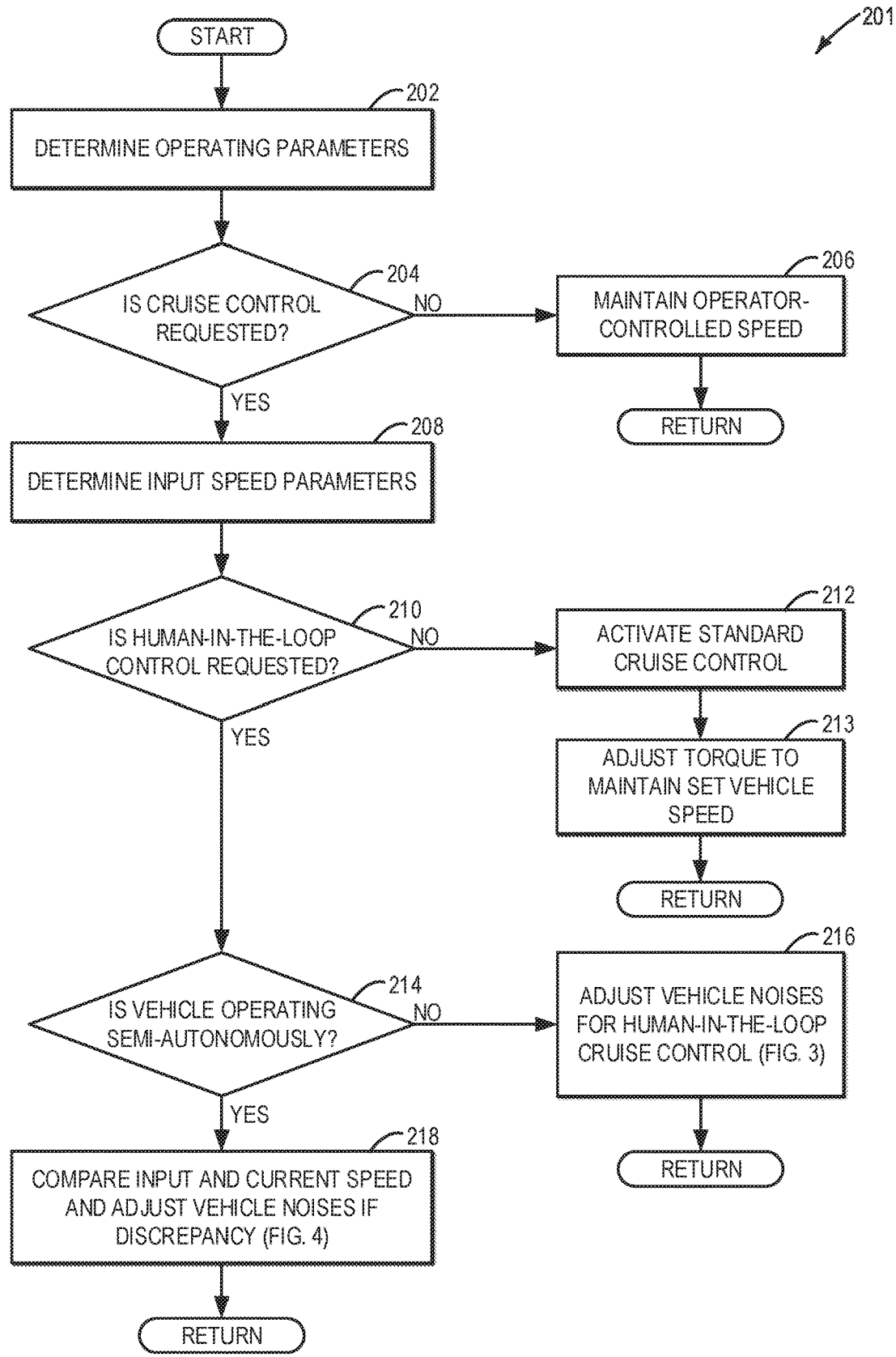
FIG. 2 is a flow chart illustrating a high-level method for operating a vehicle.
Figure 3:
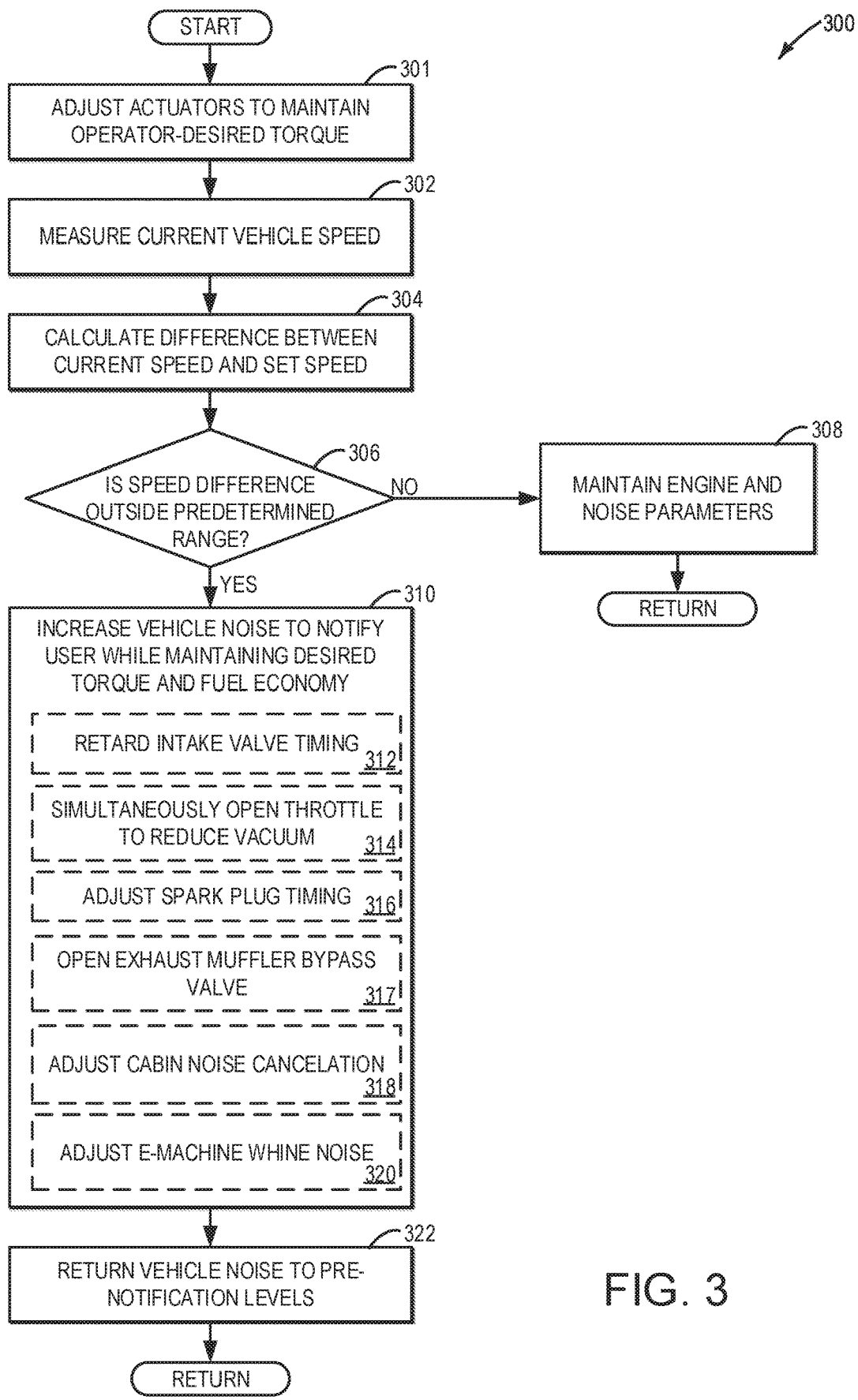
FIG. 3 is a flow chart illustrating a method for adjusting vehicle noise in a human-in-the-loop cruise control.
Figure 4:
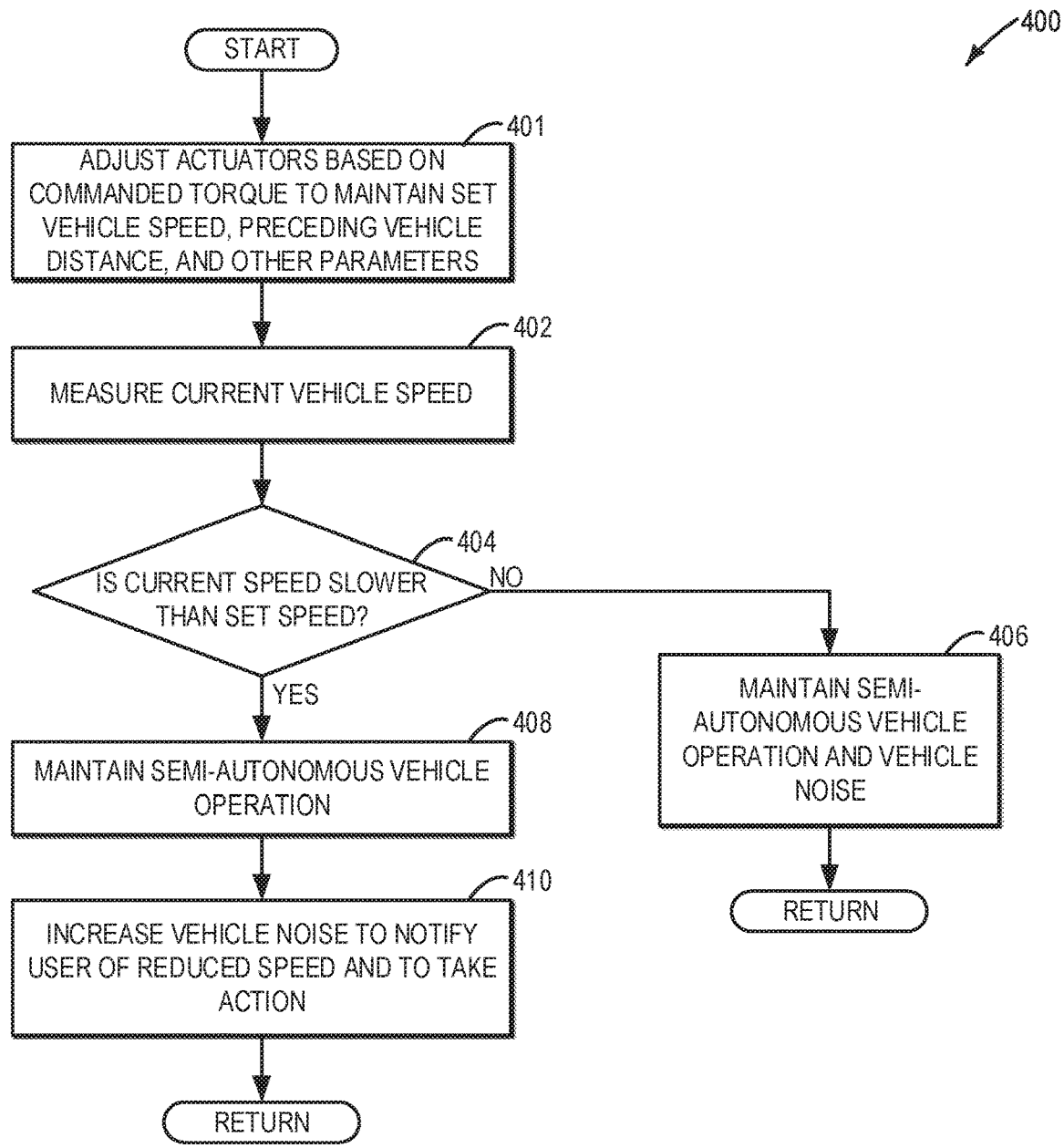
FIG. 4 is a flow chart illustrating a method for adjusting vehicle noise during semi-autonomous operation.
Figure 5:
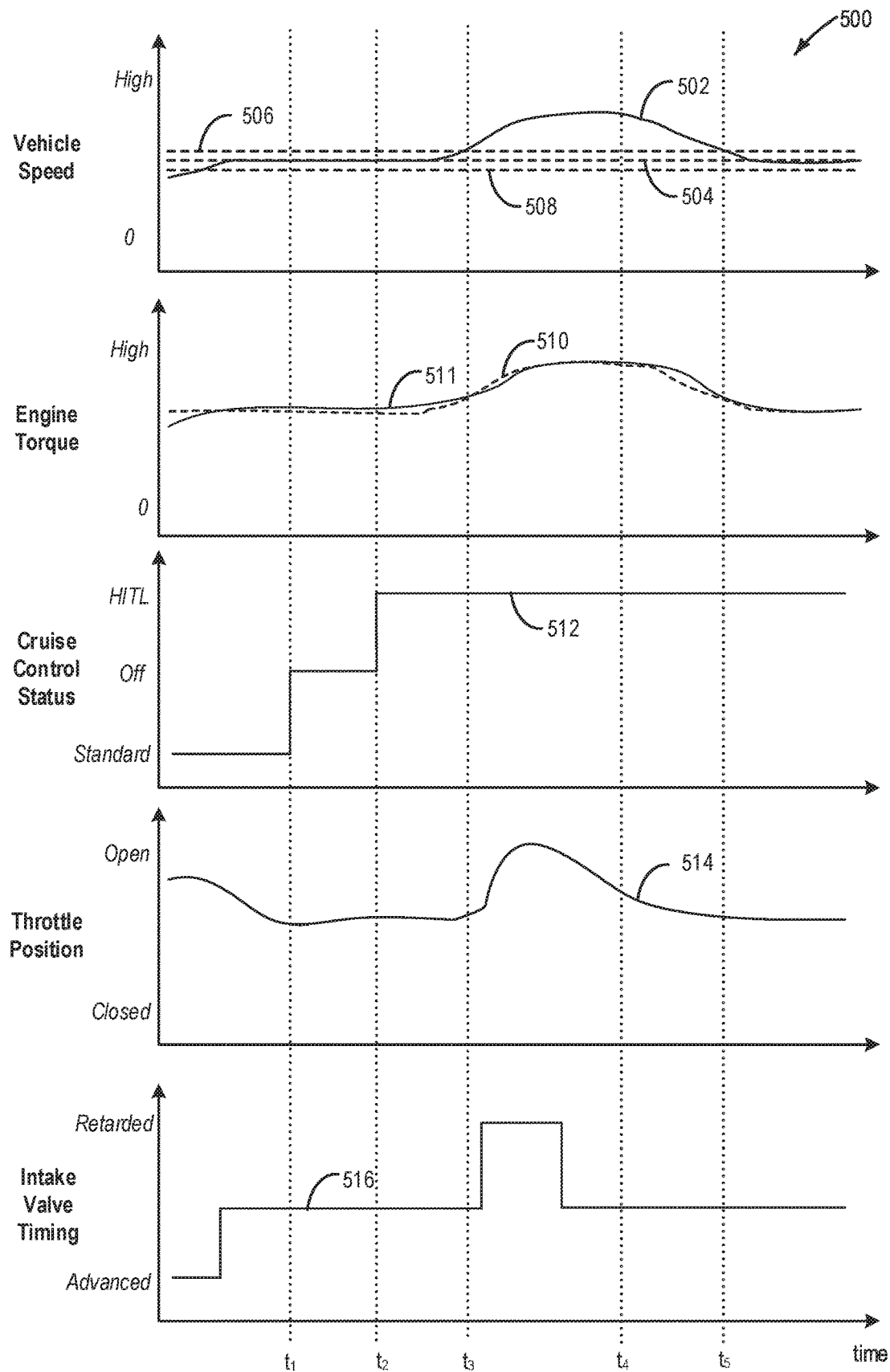
FIG. 5 is a timing diagram showing operating parameters of interest during the execution of the methods of FIG. 2 and FIG. 3.
Figure 6:
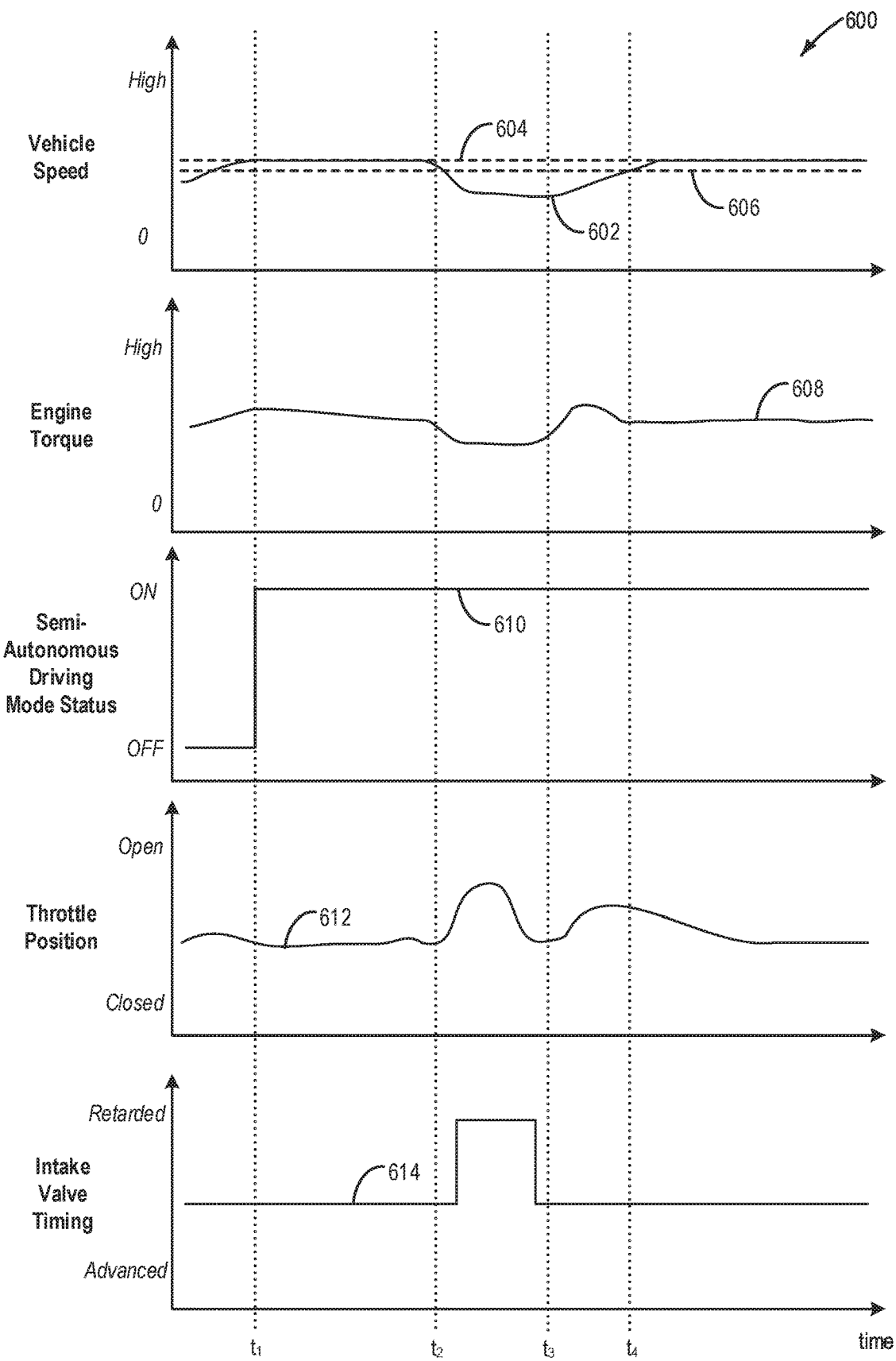
FIG. 6 is a timing diagram showing operating parameters of interest during the execution of the methods of FIG. 2 and FIG. 4.

The following description relates to systems and methods for adjusting vehicle noise to notify the vehicle operator of speed changes during human-in-the-loop cruise control and semi-autonomous vehicle operation. The cruise control, semi-autonomous operation, and vehicle noise adjustments may be implemented in a vehicle system, such as the vehicle system shown in FIGS. 1A-1B. A high-level method for operating this vehicle system is shown in FIG. 2. A method for adjusting vehicle noise in a human-in-the-loop cruise control is shown in FIG. 3. A method for adjusting vehicle noise when the vehicle is operating semi-autonomously is shown in FIG. 4. An example timeline for operating a vehicle system according to the routines of FIGS. 2-3 is shown in FIG. 5. An example timeline for operating a vehicle system according to the routines of FIG. 2 and FIG. 4 is shown in FIG. 6.

Figure 1A:
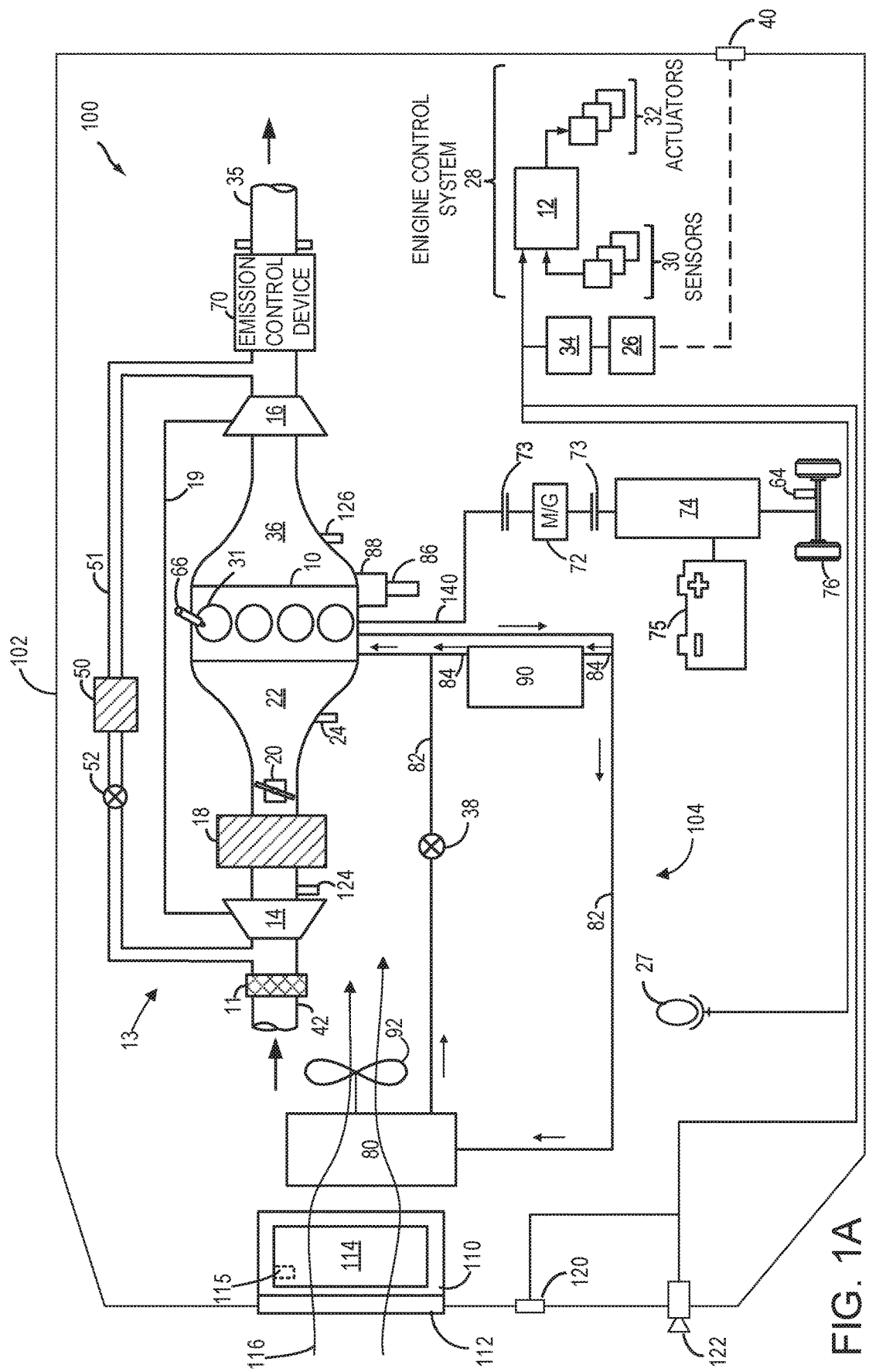
FIGS. 1A-1B schematically show an example vehicle and vehicle engine system.

Turning now to FIG. 1A, it shows a schematic of an example vehicle 102, including an engine system 100. Engine system 100 may be included in a vehicle such as a road vehicle, among other types of vehicles. While the example applications of engine system 100 will be described with reference to a vehicle, it will be appreciated that various types of engines and vehicle propulsion systems may be used, including passenger cars, trucks, and the like. Engine system 100 may include a gasoline, a diesel, or another type of internal combustion engine.

In some examples, vehicle 102 may include a drive unit that comprises multiple sources of torque available to one or more vehicle wheels 76. In other examples, vehicle 102 may include a conventional drive unit that includes only an engine as a source of torque, or the vehicle may be an electric vehicle with only electric machine(s). In the example shown, vehicle 102 includes a drive unit comprising an engine 10 and an electric machine 72. Electric machine 72 may be a motor or a motor/generator. Crankshaft 140 of engine 10 and electric machine 72 are connected via a transmission 74 to vehicle wheels 76 when one or more clutches 73 are engaged. In the depicted example, a first clutch 73 is provided between crankshaft 140 and electric machine 72, and a second clutch 73 is provided between electric machine 72 and transmission 74. Controller 12 may send a signal to an actuator of each clutch 73 to engage or disengage the clutch, so as to connect or disconnect crankshaft 140 from electric machine 72 and the components connected thereto, and/or connect or disconnect electric machine 72 from transmission 74 and the components connected thereto. Transmission 74 may be a gearbox, a planetary gear system, or another type of transmission. The powertrain may be configured in various manners including as a parallel, a series, or a series-parallel hybrid vehicle.

In the embodiment shown, electric machine 72 receives electrical power from a traction battery 75 to provide torque to vehicle wheels 76. Electric machine 72 may also be operated as a generator to provide electrical power to charge battery 75, for example during a braking operation. It will be appreciated that embodiments that include engine 10 without electrical machine 72, traction battery 75 may be replaced by a starting lighting ignition (SLI) battery.

As shown in the example engine system 100 of FIG. 1A, engine 10 is a boosted engine coupled to a turbocharger 13 including a compressor 14 driven by a turbine 16. Specifically, fresh air is introduced at intake passage 42 into engine 10 via air cleaner 11 and compressor 14. The compressor may be a suitable intake air compressor, such as a motor-driven or driveshaft driven supercharger compressor. In the engine system 100, the compressor 14 is shown as a turbocharger compressor mechanically coupled to turbine 16 via a shaft 19, the turbine 16 driven by expanding engine exhaust. In one embodiment, the compressor 14 and turbine 16 may be coupled within a twin scroll turbocharger. In another embodiment, the turbocharger 13 may be a variable geometry turbocharger (VGT), where turbine geometry is actively varied as a function of engine speed and other operating conditions.

As shown in FIG. 1A, compressor 14 is coupled, through charge air cooler (CAC) 18 to throttle valve 20. The CAC may be an air-to-air or air-to-water heat exchanger, for example. Throttle valve 20 is coupled to engine intake manifold 22. From the compressor 14, the hot compressed air charge enters the inlet of the CAC 18, cools as it travels through the CAC, and then exits to pass through the throttle valve 20 to the engine intake manifold 22. Ambient airflow 116 from outside the vehicle may enter engine 10 through a vehicle grille 112 at a vehicle front end and pass across the CAC 18, to aid in cooling the charge air. An active grille shutter system (AGS) 110 may include one or more active grille shutters 114 (also known herein as shutters, grille shutters, or the AGS system) that may be selectively controlled responsive to operating conditions including, but not limited to, engine coolant temperature and vehicle speed. In some embodiments, the position of the active grille shutters may be monitored by one or more optional AGS position sensors 115.

In the embodiment shown in FIG. 1A, the pressure of the air charge within the engine intake manifold 22 is sensed by manifold air pressure (MAP) sensor 24 and a boost pressure is sensed by boost pressure sensor 124. A compressor by-pass valve (not shown) may be coupled in series between the inlet and the outlet of compressor 14. The compressor by-pass valve may be a normally closed valve configured to open under selected operating conditions to relieve excess boost pressure. For example, the compressor by-pass valve may be opened during conditions of decreasing engine speed to avert compressor surge.

Engine intake manifold 22 is coupled to a series of combustion chambers (e.g., cylinders 31) through a series of intake valves (not shown). In addition, fuel flow to the cylinders 31 may delivered via one or more fuel injectors 66, in a configuration known as direct injection. In some examples, engine 10 may additionally or optionally include fuel injectors located in the intake manifold 22, in a configuration commonly referred to as port injection. The combustion chambers 31 are further coupled to exhaust manifold 36 via a series of exhaust valves (not shown). In the depicted embodiment, a single exhaust manifold 36 is shown. However, in other embodiments, the exhaust manifold 36 may include a plurality of exhaust manifold sections. Configurations having a plurality of exhaust manifold sections may enable effluent from different combustion chambers to be directed to different locations in the engine system. Universal Exhaust Gas Oxygen (UEGO) sensor 126 is shown coupled to exhaust manifold 36 upstream of turbine 16. Alternatively, a two-state exhaust gas oxygen sensor may be substituted for UEGO sensor 126.

As shown in FIG. 1A, exhaust from the one or more exhaust manifold sections is directed to turbine 16 to drive the turbine. When reduced turbine torque is desired, some exhaust may be directed instead through a waste gate (not shown), by-passing the turbine. The combined flow from the turbine and the waste gate then flows through emission control device 70. In general, the emission control device 70 may include a plurality of emission control devices such as one or more exhaust after-treatment catalysts configured to catalytically treat the exhaust flow, and thereby reduce an amount of one or more substances in the exhaust flow.

All or part of the treated exhaust from emission control device 70 may be released into the atmosphere via exhaust conduit 35. Depending on operating conditions, however, some exhaust may be diverted instead to EGR passage 51, through EGR cooler 50 and EGR valve 52, to the inlet of compressor 14. In this manner, the compressor is configured to admit exhaust tapped from downstream of turbine 16. The EGR valve 52 may be opened to admit a controlled amount of cooled exhaust gas to the compressor inlet for desirable combustion and emissions-control performance. In this way, engine system 100 is adapted to provide external, low-pressure (LP) EGR. The rotation of the compressor 14, in addition to the relatively long LP EGR flow path in engine system 100, may provide excellent homogenization of the exhaust gas into the intake air charge. Further, the disposition of EGR take-off and mixing points may provide more effective cooling of the exhaust gas for increased available EGR mass and enhanced performance. In other embodiments, the EGR system may be a high-pressure (HP) EGR system with EGR passage 51 connecting from upstream of the turbine 16 to downstream of the compressor 14.

Motor vehicle 102 further includes a cooling system 104 that circulates coolant through internal combustion engine 10 to absorb waste heat and distributes the heated coolant to radiator 80 and/or heater core 90 via coolant lines 82 and 84, respectively. In particular, FIG. 1A shows cooling system 104 coupled to engine 10 and circulating engine coolant from engine 10 to radiator 80 via engine-driven water pump 86, and back to engine 10 via coolant line 82. Engine-driven water pump 86 may be coupled to the engine via front end accessory drive (FEAD) 88, and rotated proportionally to engine speed via a belt, chain, or the like (not shown). Specifically, engine-driven water pump 86 circulates coolant through passages in the engine block, engine head, and the like, to absorb engine heat, which is then transferred via the radiator 80 to ambient air. In an example where engine-driven water pump 86 is a centrifugal pump, the pressure (and resulting flow) produced at the engine-driven water pump outlet may be proportional to the crankshaft speed, which in the example of FIG. 1A, is directly proportional to engine speed. In another example, a motor-controlled pump may be used that can be adjusted independently of engine rotation. The temperature of the coolant (e.g., engine coolant temperature, ECT) may be regulated by a thermostat valve 38, located in the coolant line 82, which may be kept closed until the coolant reaches a threshold temperature.

Engine system 100 may include an electric fan 92 for directing cooling airflow toward the CAC 18, engine cooling system 104, or other engine system components. In some embodiments, electric fan 92 may be an engine cooling fan. The engine cooling fan may be coupled to radiator 80 in order to maintain airflow through radiator 80 when vehicle 102 is moving slowly or stopped while the engine is running. Fan rotation speed or direction may be controlled by a controller 12. In one example, the engine cooling fan may also direct cooling airflow toward CAC 18. Alternatively, electric fan 92 may be coupled to the engine FEAD 88 and driven by the engine crankshaft 140. In other embodiments, electric fan 92 may act as a dedicated CAC fan. In this embodiment, the electric fan 92 may be coupled to the CAC 18 or placed in a location to direct airflow directly toward the CAC 18. In yet another embodiment, there may be two or more electric fans 92. For example, one may be coupled to the radiator (as shown) for engine cooling, while the other may be coupled elsewhere to direct cooling air directly toward the CAC 18. In this example, the two or more electric fans 92 may be controlled separately (e.g., at different rotation speeds) to provide cooling to their respective components.

Coolant may flow through coolant line 82, as described above, and/or through coolant line 84 to heater core 90 where the heat may be transferred via air ducts (not shown) to the passenger compartment, and the coolant flows back to engine 10. In some examples, engine-driven water pump 86 may operate to circulate the coolant through both coolant lines 82 and 84.

FIG. 1A further shows an engine control system 28. Control system 28 may be communicatively coupled to various components of engine system 100 to carry out the control routines and actions described herein. For example, as shown in FIG. 1A, control system 28 may include an electronic digital controller 12, which will be explained in more detail below with respect to FIG. 1B. As depicted, controller 12 may receive input from a plurality of sensors 30, which may include user inputs and/or sensor input data (e.g., transmission gear position, accelerator pedal position input, brake pedal input, transmission selector position, vehicle speed from vehicle speed sensor 64 disposed proximate a vehicle wheel, engine speed, mass airflow through the engine, boost pressure, ambient temperature, ambient humidity, intake air temperature, fan speed, ambient light), cooling system sensors (e.g., engine coolant temperature, fan speed, passenger compartment temperature, ambient humidity), CAC 18 sensors (e.g., CAC inlet air temperature and pressure, CAC outlet air temperature and pressure), one or more optional AGS position sensors 115, and other vehicle sensors. In addition, controller 12 may receive data from a GPS 34, an in-vehicle communications and entertainment system 26, and/or other control systems of vehicle 102.

The in-vehicle communications and entertainment system 26 may communicate with a wireless communication device 40 via various wireless protocols, such as wireless networks, cell tower transmissions, and/or combinations thereof. Data obtained from the in-vehicle communications and entertainment system 26 may include real-time and forecasted weather conditions. Weather conditions, such as temperature, cloud cover, precipitation (e.g., rain, snow, hail, etc.), and humidity, may be obtained through various wireless communication device applications and weather-forecasting websites. Data obtained from the in-vehicle communications and entertainment system 26 may include current and predicted weather conditions for the current location, as well as future locations along a planned travel route. In one embodiment, where the in-vehicle communications and entertainment system 26 includes a GPS 34, current and future weather data may be correlated with current and future travel routes displayed on the GPS 34. In an alternate embodiment, wherein the vehicle system includes a dedicated GPS 34, each of the GPS 34 and the in-vehicle communications and entertainment system 26 may communicate with the wireless communication device 40, as well as with each other, to communicate current and future weather data with current and future travel routes. In one example, the in-vehicle communications and entertainment system 26 may access various weather maps stored on the internet or other cloud computing systems. The stored weather maps may include rain, humidity, precipitation, ambient light information, and/or temperature information provided as contour maps, for example. In another example, the wireless communication device 40 may relay real-time weather data to the in-vehicle communications and entertainment system 26, and/or GPS 34, which is then relayed to the controller 12. The controller 12 may compare the received weather data (which may include humidity data) to threshold values and determine the appropriate engine operating parameter adjustments. In one example, these adjustments may include adjusting the AGS system 110. For example, if humidity is greater than a defined threshold, one or more vanes of the AGS may be closed. Furthermore, controller 12 may communicate with various actuators 32, which may include engine actuators (e.g., fuel injectors, an electronically controlled intake air throttle plate, spark plugs), cooling system actuators (e.g., air handling vents and/or diverter valves in the passenger compartment climate control system), AGS system actuators (e.g., AGS vanes, an AGS motor), and others. In some examples, the storage medium of controller 12 may be programmed with computer readable data representing instructions executable by the processor for performing the methods described below as well as other variants that are anticipated but not specifically listed.

Motor vehicle 102 may further include a cruise control system operable to control, direct, and/or request control, such as with assistance from the controller 12, to engage and otherwise control operation of the engine 10, motor, and powertrain, including but not limited to controlling shifting operations of the powertrain/transmission according to a desired operational strategy. The cruise control system may be part of the engine control system 28 of the vehicle or a separate component communicatively connected to the controller. The vehicle's powertrain control module (PCM), such as controller 12, may be capable of detecting if the vehicle is operating in a cruise-like mode based on vehicle speed, acceleration, and engine load, among others.

The cruise control system may be operatively coupled to the vehicle transmission 74. The cruise control system may be adapted to decouple the vehicle wheels from the engine. The cruise control system may be adapted to disengage a transmission clutch of the vehicle.

For example, one non-limiting aspect of the present disclosure includes the cruise control system being operable to control the vehicle in cruise control mode where a desired vehicle speed is automatically maintained, for example, without continuous driver interaction and/or manipulation of the accelerator pedal. The cruise control system may include a cruise control interface (not shown) operable to set the desired vehicle speed and receive other inputs from the user associated with performing cruise control functions, or in some cases a remote or wireless entity operable to control the vehicle.

Motor vehicle 102 may further include a radar system 120 or a vehicle camera system 122 for measuring the distance between the vehicle and a preceding target vehicle (not shown) and also relative vehicle speed. The radar system, vehicle camera system, and cruise control system may comprise an adaptive cruise control (ACC) system. An ACC system may enhance performance of vehicle cruise control by allowing a vehicle to actively track a target vehicle to maintain a follow distance that is proportional to the timed headway between the vehicles plus some minimum distance. The speed of the follow vehicle is controlled by controlling the application of acceleration force to the vehicle over a range spanning positive and negative accelerations.

In addition, motor vehicle 102 may include a human-in-the-loop cruise control system, which provides full control of vehicle speed to the vehicle operator but assists in notifying the vehicle operator of the vehicle speed. The vehicle operator may input a set (e.g., target) speed and the vehicle may notify the vehicle operator if the vehicle is not moving at the set speed (or within a predetermined set speed tolerance). The vehicle operator may be notified that the vehicle speed is outside the set speed tolerance via modulation of vehicle noise, as explained in more detail below. In some examples, a microphone 27 or other sound-detecting device may be present in the vehicle cabin to detect noise levels that may be experienced by an operator of the vehicle. Microphone 27 may be configured to send sound information to the controller 12.

Furthermore, motor vehicle 102 may include semi-autonomous driving capabilities. A semi-autonomous driving feature may resemble adaptive cruise control but may also include lane following and steering capabilities. A semi-autonomous driving system may enhance vehicle performance, provide driver and passenger comfort, and improve safety while still allowing the vehicle operator navigational control and the ability to change lanes. During semi-autonomous mode, the vehicle operator may remain behind the wheel but may provide minimal inputs during operation in the semi-autonomous mode. The semi-autonomous mode may be initiated during highway driving or other low-demand driving conditions. In the semi-autonomous mode, certain decisions, such as lane changes, may still be made by the vehicle operator. In contrast, full autonomous mode may not require a vehicle operator behind the wheel and may include all vehicle operational decisions being made automatically by the vehicle. The radar system 120, the vehicle camera system 122, the GPS 34, the wireless communication device 40, the engine control system 28, and the in-vehicle communications and entertainment system 26 may comprise the semi-autonomous driving system.

Figure 1B:
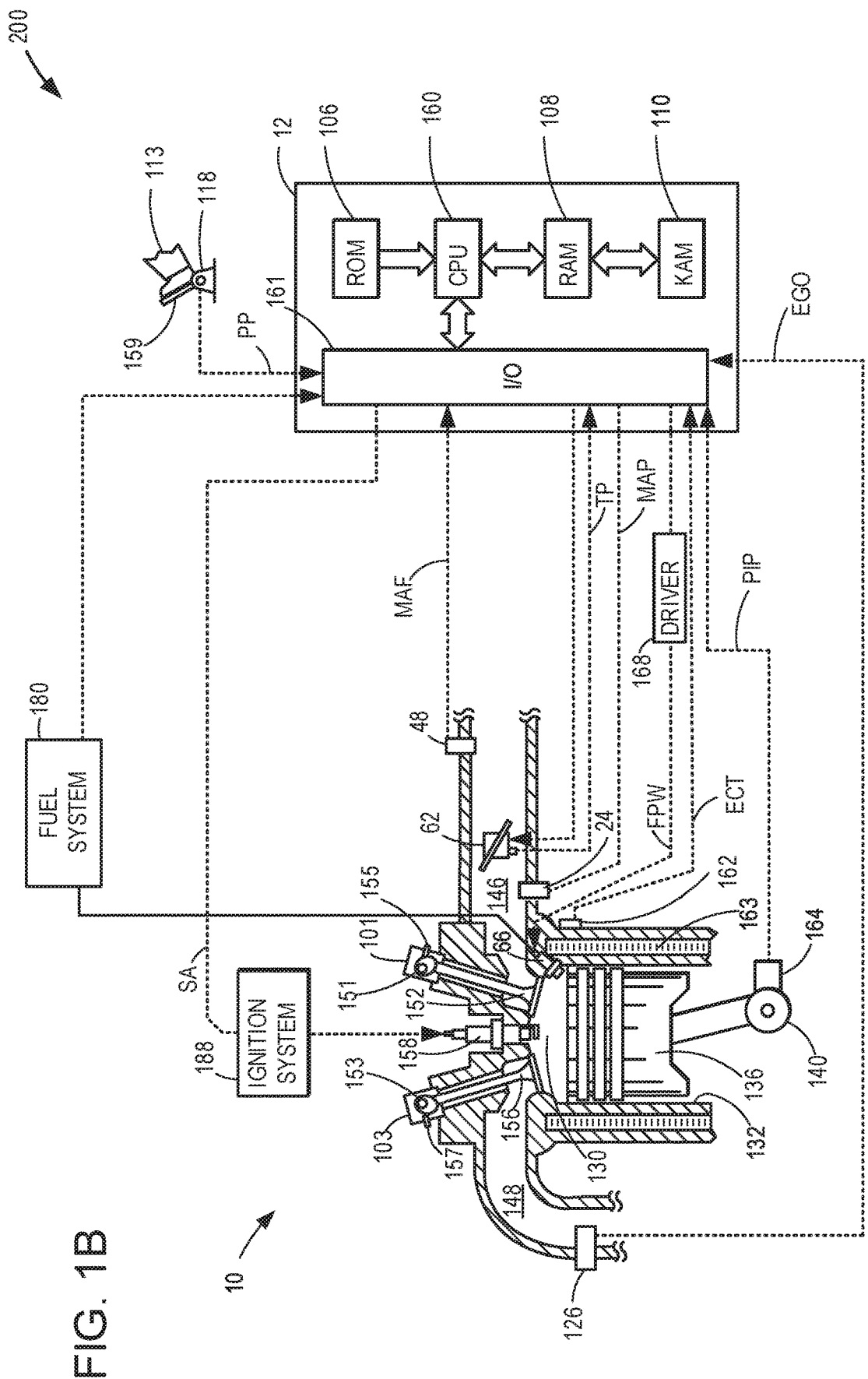

Referring now to FIG. 1B, a vehicle engine system 200 having an internal combustion engine 10 and a controller 12 is shown schematically. FIG. 1B depicts a partial view of a single cylinder of internal combustion engine 10 which may be installed in a vehicle 102. As such, components previously introduced in FIG. 1A are represented with the same reference numbers and are not re-introduced. Engine 10 is depicted with combustion chamber (cylinder) 130, coolant sleeve 163, and cylinder walls 132 with piston 136 positioned therein and connected to crankshaft 140. Combustion chamber 130 is shown communicating with intake passage 146 and exhaust passage 148 via respective intake valve 152 and exhaust valve 156. As previously described in FIG. 1A, each cylinder of engine 10 may exhaust combustion products along two conduits. In the depicted view, exhaust passage 148 represents the first exhaust runner (e.g., port) leading from the cylinder to the turbine (such as first exhaust runner 86 of FIG. 1A) while the second exhaust runner is not visible in this view.

In the depicted view of FIG. 1B, intake valve 152 and exhaust valve 156 are located at an upper region of combustion chamber 130. Intake valve 152 and exhaust valve 156 may be controlled by controller 12 using respective cam actuation systems including one or more cams. The cam actuation systems may utilize one or more of cam profile switching (CPS), variable cam timing (VCT), variable valve timing (VVT), and/or variable valve lift (VVL) systems to vary valve operation. In the depicted example, intake valve 152 is controlled by an intake cam 151 and exhaust valve 156 is controlled by an exhaust cam 153. The intake cam 151 may be actuated via an intake valve timing actuator 101 and the exhaust cam 153 may be actuated via an exhaust valve timing actuator 103 according to set intake and exhaust valve timings, respectively. In some examples, the intake valves and exhaust valves may be deactivated via the intake valve timing actuator 101 and exhaust valve timing actuator 103, respectively. For example, the controller may send a signal to the exhaust valve timing actuator 103 to deactivate the exhaust valve 156 such that it remains closed and does not open at its set timing. The position of intake valve 152 and exhaust valve 156 may be determined by valve position sensors 155 and 157, respectively.

In some embodiments, the intake and/or exhaust valve may be controlled by electric valve actuation. For example, cylinder 130 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

In one example, intake cam 151 includes separate and different cam lobes that provide different valve profiles (e.g., valve timing, valve lift, duration, etc.) for each of the two intake valves of combustion chamber 130. Likewise, exhaust cam 153 may include separate and different cam lobes that provide different valve profiles (e.g., valve timing, valve lift, duration, etc.) for each of the two exhaust valves of combustion chamber 130. In another example, intake cam 151 may include a common lobe, or similar lobes, that provide a substantially similar valve profile for each of the two intake valves.

Exhaust gas sensor 126 is shown coupled to exhaust passage 148. Sensor 126 may be positioned in the exhaust passage upstream of one or more emission control devices, such as device 70 of FIG. 1A. Sensor 126 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. The downstream emission control devices may include one or more of a three way catalyst (TWC), NOx trap, GPF, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc.

Cylinder 130 can have a compression ratio, which is the ratio of volumes when piston 136 is at bottom center to top center. Conventionally, the compression ratio is in the range of 9:1 to 10:1. However, in some examples where different fuels are used, the compression ratio may be increased. An increased compression ratio may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 158 for initiating combustion. Ignition system 188 can provide an ignition spark to combustion chamber 130 via spark plug 158 in response to spark advance signal SA from controller 12, under select operating modes. However, in some embodiments, spark plug 158 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 130 is shown including one fuel injector 66. Fuel injector 66 is shown coupled directly to combustion chamber 130 for injecting fuel directly therein in proportion to the pulse width of signal FPW received from controller 12 via electronic driver 168. In this manner, fuel injector 66 provides what is known as direct injection (hereafter also referred to as "DI") of fuel into combustion cylinder 130. While FIG. 1B shows injector 66 as a side injector, it may also be located overhead of the piston, such as near the position of spark plug 158. Such a position may improve mixing and combustion when operating the engine with an alcohol-based fuel due to the lower volatility of some alcohol-based fuels. Alternatively, the injector may be located overhead and near the intake valve to improve mixing. In an alternate embodiment, injector 66 may be a port injector providing fuel into the intake port upstream of cylinder 130.

Fuel may be delivered to fuel injector 66 from a high pressure fuel system 180 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. Fuel tanks in fuel system 180 may hold fuel with different fuel qualities, such as different fuel compositions. These differences may include different alcohol content, different octane, different heat of vaporizations, different fuel blends, and/or combinations thereof etc. In some embodiments, fuel system 180 may be coupled to a fuel vapor recovery system including a canister for storing refueling and diurnal fuel vapors. The fuel vapors may be purged from the canister to the engine cylinders during engine operation when purge conditions are met. For example, the purge vapors may be naturally aspirated into the cylinder via the first intake passage at or below barometric pressure.

Engine 10 may be controlled at least partially by controller 12 and by input from a vehicle operator 113 via an input device 118 such as an accelerator pedal 159. The input device 118 sends a pedal position (PP) signal to controller 12. Controller 12 is shown in FIG. 1B as a microcomputer, including a microprocessor unit 160, input/output ports 161, an electronic storage medium for executable programs and calibration values shown as a read only memory 106 in this particular example, random access memory 108, keep alive memory 110, and a data bus. Storage medium read-only memory 106 can be programmed with computer readable data representing instructions executable by microprocessor 160 for performing the methods and routines described below as well as other variants that are anticipated but not specifically listed. Controller 12 may receive various signals from sensors coupled to engine 10, in addition to those signals previously discussed, including measurement of inducted mass air flow (MAF) from mass air flow sensor 48; engine coolant temperature (ECT) from temperature sensor 162 coupled to coolant sleeve 163; a profile ignition pickup signal (PIP) from Hall effect sensor 164 (or other type) coupled to crankshaft 140; throttle position (TP) from a throttle position sensor; absolute manifold air pressure (MAP) signal from sensor 24, cylinder AFR from EGO sensor 126, and abnormal combustion from a knock sensor and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold.

Based on input from one or more of the above-mentioned sensors, controller 12 may adjust one or more actuators, such as fuel injector 66, throttle 62, spark plug 158, intake/exhaust valves and cams, etc. The controller may receive input data from the various sensors, process the input data, and trigger the actuators in response to the processed input data based on instruction or code programmed therein corresponding to one or more routines.

Thus, as described above with respect to FIGS. 1A-2, engine control system 28 is configured to receive output from a plurality of sensors of engine system 100 and adjust one or more actuators of engine system 100 based on the output from the sensors. According to embodiments described herein and in more detail below, an operator of the vehicle may request the vehicle operate in various cruise control modes where some vehicle operational decisions, such as vehicle speed, are controlled by the vehicle automatically. However, during modes of operation where the operator desires to maintain full control over vehicle speed, the operator may still desire to be notified when the vehicle exceeds an operator-set maximum speed. To provide an unobtrusive notification, and the engine control system may be configured to adjust one or more actuators to increase engine and/or vehicle noise while maintaining certain vehicle parameters, such as wheel torque and fuel economy. For example, throttle valve 20 may be moved to a more open position (e.g., wide open) to increase engine noise, while the timing of the intake valve 152 may be retarded to maintain a relatively constant admission of intake air to the cylinder, thus maintaining engine torque (and hence continuing to deliver operator-requested torque and vehicle speed).

Additionally or alternatively, during modes of operation where the vehicle maintains near-full control over vehicle operation (e.g., during the semi-autonomous mode described above), the operator may desire to be notified when the vehicle speed is below an operator-set maximum or target speed, in particular when the vehicle speed has remained below the set speed for a predetermined duration. In such examples, the operator may be able to resume control of vehicle operation to execute a maneuver (e.g., a lane change) not authorized by the semi-autonomous control. The engine and/or vehicle noise may be adjusted similarly as described above to notify the operator of the low speed conditions. In this way, vehicle noise may be adjusted and increased as an unobtrusive notification technique of speed notification in both a human-in-the-loop cruise control and semi-autonomous vehicle operation.

Referring now to FIG. 2, a high-level method 201 for operating a vehicle configured for various modes of cruise control is shown. Instructions for carrying out method 201 and the rest of the methods included herein may be executed by a controller (e.g., control system 28 of FIG. 1A) based on instructions stored on the memory of the controller and in conjunction with signals received from sensors of the engine control system 28, the GPS 34, and/or the wireless communication device 40. The controller may employ engine actuators of the engine system to adjust engine operation according to the methods described below.

At 202, method 201 determines operating parameters. The determined operating parameters may include, but are not limited to, engine speed, engine load, vehicle speed, and/or the distance to a preceding vehicle in front of the vehicle. At 204, method 201 determines if cruise control has been requested by the user. The presence of a cruise control request may be determined by a command from the engine control system, which in turn may receive a cruise control command from the vehicle operator via the in-vehicle communications and entertainment system. The vehicle operator may enter the cruise control command via voice, a physical switch, or a button push, for example. If cruise control is not requested by the user, method 201 proceeds to 206 and maintains operator-controlled speed. Operator-controlled speed may include vehicle speed being maintained at an operator-requested speed that is determined according to inputs received from an input device, such as the accelerator pedal (e.g., pedal 159 of FIG. 1B). Additionally, during full operator control mode, vehicle trajectory, braking, etc., may be controlled in response to inputs from the operator. Further, the operator may not be notified of vehicle speed in any manner other than via the standard control mechanism (e.g., via the displayed speedometer output on the notification panel of the vehicle). Method 201 then returns.

If cruise control is requested by the user, method 201 proceeds to 208 and determines input speed parameters. The input speed parameters may include a user-set speed (e.g., a speed at which the user desires to maintain the vehicle), speed limits recognized by road signs or determined via GPS 34 or wireless communication device 40, and a set speed tolerance. The set speed tolerance may be a percentage of the user-set speed (e.g., 5%), a constant value (e.g., 5 MPH), or another calculated amount. At 210, method 201 determines if human-in-the-loop control is requested, which uses vehicle noise to notify the vehicle operator if the vehicle is moving at a speed outside the set speed tolerance but allows the vehicle operator full control of the vehicle speed. The vehicle operator may request human-in-the-loop cruise control via voice, a physical switch, or a button push. The vehicle operator may request cruise control, input the set speed, and specify human-in-the-loop cruise control in a single voice command as well. If human-in-the-loop control is not requested, method 201 proceeds to 212 to activate standard cruise control. At 213, operating in standard cruise control may include adjusting torque to maintain vehicle speed at the set vehicle speed. For example, to maintain vehicle speed while the vehicle is traversing a hill, the controller may be configured to command an increase in engine torque, and in response, the intake throttle (e.g., valve 20) may be opened and/or intake valve timing may be advanced. Further, boost pressure may be increased and/or spark timing may be adjusted. In one example, standard cruise control may include an adaptive cruise control (ACC) mode, where vehicle speed is controlled to stay at the user-set speed unless a distance to a preceding vehicle drops below a threshold distance, in which case the speed of the vehicle may be decreased in order to maintain a predetermined distance between the vehicle and the preceding vehicle. In other examples, the standard cruise control may include vehicle speed being maintained at the user-set speed at all times unless a braking input is received. Method 201 then returns.

If human-in-the-loop control is requested, method 201 proceeds to 214 and determines if the vehicle is operating semi-autonomously. The vehicle may be determined to be operating semi-autonomously based on a signal or saved state from engine control system 28. For example, the operator of the vehicle may enter a user input to the in-vehicle communications and entertainment system requesting operation in the semi-autonomous mode. If the vehicle is not operating semi-autonomously, method 201 proceeds to 216 to adjust vehicle noise for human-in-the-loop cruise control, where vehicle noise may be modulated to notify the user if the vehicle is operating at a speed outside a threshold range of the set vehicle speed. Human-in-the-loop cruise control will be explained in more detail below with respect to FIG. 3. If the vehicle is operating semi-autonomously, method 201 proceeds to 218 to continue to operate semi-autonomously, and adjusts vehicle noise based on speed discrepancies to notify the user, which will be explained in more detail below with respect to FIG. 4. Following both 216 and 218, method 201 returns.

Turning to FIG. 3, a method 300 for operating a vehicle in a human-in-the-loop cruise control mode including modulating vehicle noise to notify the vehicle operator when the vehicle is operating at a speed outside the set vehicle speed is shown. Method 300 may be performed as part of method 201, for example in response to a user request to operate in the human-in-the-loop cruise control mode at 214. At 301, method 300 includes adjusting one or more actuators to maintain operator-requested torque (e.g., engine and/or wheel torque). For example, based on the position of an accelerator pedal, the controller may determine an operator-requested torque level and adjust engine operating parameters, such as intake air flow, fuel injection amounts, etc., to maintain torque at the operator desired level. In doing so, vehicle speed may be controlled by the operator. Additionally, in hybrid of full electric drive units, vehicle speed may be maintained by adjusting one or more electric machines coupled to the vehicle wheels, for example.

At 302, method 300 measures the current vehicle speed from a speed sensor (e.g., vehicle speed sensor 64 of FIG. 1A) interfaced with engine control system 28, or vehicle speed may be determined from GPF information obtain from GPS 34, for example. At 304, method 300 calculates the difference between the current vehicle speed and the set speed (as described above with respect to FIG. 2, the set speed may be a user-requested maximum vehicle speed or the set speed may be a speed limit of the road on which the vehicle is currently traveling). At 306, method 300 determines whether the calculated speed difference is outside a predetermined range. The predetermined range may be defined by the set speed along with the set speed tolerance determined at 208 in method 201. For example, the user-set speed may be 60 MPH and the set speed tolerance may be 5 MPH. Thus, if the measured speed is 65 MPH (or greater) or if the measured speed is 55 MPH (or less), the calculated speed difference may be outside the predetermined range. If the calculated speed difference is not outside the predetermined range, method 300 proceeds to 308 and maintains the current vehicle noise parameters. For example, engine actuators (such as the cylinder valves, spark plugs, throttle valve, etc.) may be adjusted according to engine speed and load to deliver demanded wheel torque and may not be adjusted to increase vehicle noise. Method 300 returns.

If the calculated speed difference is outside the predetermined range, method 300 proceeds to 310 and takes action to notify the vehicle operator that the vehicle speed is outside the operator-requested range by increasing vehicle noise while maintaining vehicle parameters, including wheel torque and fuel economy. Vehicle noise may be increased by adjusting one or more drive unit actuators that allow for vehicle performance, such as wheel torque and/or fuel economy, to be maintained but change or increase vehicle noise to notify the vehicle operator the vehicle is outside the predetermined speed range. In addition, vehicle noise may be ramped within the predetermined speed range, such as if the driver sets the vehicle speed to be 60 MPH, the vehicle noise may gradually change between 55 MPH and 60 MPH. At vehicle speeds above the set vehicle speed, vehicle noise may change or continue to gradually increase in volume based on the current vehicle speed. In other examples, the increase in vehicle noise may occur once the vehicle speed reaches the set speed (e.g., 60 MPH), but the increase in vehicle noise may ramp in gradually, increasing as the vehicle speed increases above 60 MPH. Once the vehicle speed reaches the upper limit of the predetermined range (e.g., 65 MPH), the vehicle noise may step up to a louder level.

The selection of which actuator(s) to adjust to increase the vehicle noise may be based on one or more look-up tables, such as a "change in sound" table which may plot predicted vehicle change in sound as a function of changes to specific drive unit actuators, such as intake valve timing, exhaust valve position, throttle position, turbo-bypass valve position, intake manifold runner control position, transmission gear, and electric machine whine. Furthermore, fuel economy tables, which are also a function of the same actuator changes in the "change in sound" table, may also be consulted. For example, the controller may access a fuel economy table that plots fuel economy as a function of a future state of one or more engine parameters, such as a fuel economy for a future intake valve timing (where the future intake valve timing is the intake valve timing that the engine may be adjusted to operate with, in order to cause the desired change in vehicle noise). The engine control system may then arbitrate the best combination of drive unit actuator changes that maintain engine and/or wheel torque, have the highest perceivable sound change, and minimize fuel economy impact. The sound may also be adjusted as a function of the calculated speed difference or of how well the vehicle operator can detect a given change in vehicle noise.

One example of engine parameter modification that may be used to maintain engine and/or wheel torque and fuel economy, but increase vehicle noise, is the simultaneous adjustment of intake valve timing, indicated at 312 (e.g., the opening and/or closing timing of intake valve 152) via an intake cam (such as intake cam 151) and intake valve timing actuator (such as actuator 101) along with adjustment of the position of an intake throttle, such as throttle 159, indicated at 314. Intake valve timing may be used to control engine torque by regulating how much air enters the cylinders from the intake passage. For example, retarding intake valve timing (e.g., closing the intake valves later in the compression stroke) may lower torque by trapping less air in the cylinders, while advancing intake valve timing (e.g., closing the intake valves earlier in the compression stroke) by increase torque by trapping more air in the cylinders. The amount of air in the intake passage may be regulated by the position of the intake throttle, as opening the throttle allows more air into the intake passage and closing the throttle reduces the amount of air entering the intake passage. By opening the throttle and closing the intake valves at a later timing, the engine is able to maintain engine torque. Increasing the amount of air inside the intake passage produces more vehicle noise because pressure waves produced from the engine can travel farther and create more noise, which primarily comes out of the intake passage inlet.

In another example, as indicated at 316, the timing of the spark plugs (e.g., spark plug 158) may also be adjusted with throttle position to increase vehicle noise. Adjusting the spark plug timing away from a predetermined optimum timing causes the engine to produce less engine torque, which may be compensated for by increasing engine torque by increasing air entering the cylinders by opening the throttle, adjusting the engine intake and exhaust valves, or other actuators that control air flow. The presence of more air in the intake passage produces more vehicle noise.

In a further example, vehicle noise may be increased by adjusting the transmission gear ratio. The vehicle transmission may shift into a lower gear ratio, which may increase engine/vehicle noise. In order to maintain wheel torque at the operator-requested level, the engine control system may adjust boost pressure, spark plug timing, intake throttle position, and/or other actuators. For example, downshifting into a lower numerical transmission gear increases engine speed while also increasing the torque multiplication (torque ratio) between the engine and the wheel. The increased engine speed will create a different frequency and magnitude of engine sound. Additionally, to maintain the same torque at the wheels, which is similar to maintaining the same power, engine torque may be adjusted because of the higher engine speed and greater transmission torque multiplication. For example, engine torque may be adjusted by increasing the air entering the engine (e.g., via opening the throttle valve, increasing boost pressure).

In the above-described examples, one or more engine actuators are adjusted to increase engine noise, in order to notify an operator in a non-obtrusive manner than that vehicle speed is higher than a set speed. These adjustments could result in changes to engine torque, leading to changes in vehicle speed not requested by the operator. Thus, one or more compensating adjustments may be made to ensure operator-requested vehicle speed is maintained. Because vehicle speed and/or engine torque may be changing when the engine noise is modulated to notify the operator, the term "maintain torque within a threshold" as used herein may include instances where the torque is adjusted, but the torque is maintained within a threshold of the toque desired by the operator. In this way, engine torque may still be adjusted if requested by the operator, independent of whether the vehicle speed is above the set vehicle speed.

In another example, as indicated at 317, the inclusion and adjusting of an exhaust muffler bypass valve may be used to increase vehicle noise to notify the vehicle operator that the vehicle is outside the predetermined speed range. Since the exhaust muffler reduces vehicle noise, adjusting an exhaust muffler bypass valve may allow vehicle noise to increase while maintaining wheel torque and fuel economy.

Increased vehicle noise may also be achieved by deactivating or adjusting the noise cancelation in the vehicle cabin, as indicated at 318, and/or increasing e-machine whine noise, as indicated at 320. For example, to deliver the same wheel torque with different sound levels in an electrified vehicle, the e-machine speed may be adjusted by changing a transmission gear, or adjusting the speed ratio of a continuously variable speed transmission (CVT) and by adjusting the e-machine torque. Additionally, in a hybrid vehicle that has an engine and e-motor, the same wheel torque may be delivered with different sound by reducing the e-machine torque, while increasing the engine torque. Additionally the controller for the e-machine may be able to adjust the magnetic phasing timing to adjust sound levels. In addition to cabin noise cancelation and e-machine whine, actions utilizing other actuators may be taken to notify the vehicle operator of vehicle speed outside the predetermined range, such as vibration in the gas pedal or steering wheel or changing seat lumbar support.

Method 300 then proceeds to 322, where the increased vehicle noise notification ends and the vehicle noise returns to pre-notification levels. For example, the intake throttle may be moved to a more closed position (e.g., the prior position of the throttle before adjusting the throttle to increase vehicle noise) and the cylinder intake valve timing may be advanced back to a timing for optimal fuel economy. This return to pre-notification vehicle noise levels may occur after several seconds to generate a "notification pulse" for the vehicle operator. In another example, the return to pre-notification vehicle noise may occur when the vehicle operator changes the vehicle speed to be within the set input speed tolerance. In another example, the noise is ramped out as the vehicle speed reduces from the threshold. The increased vehicle noise notifications allow the vehicle operator to choose whether to adjust the speed of the vehicle, thus engaging the vehicle operator and enabling a human-in-the-loop cruise control. After 322, method 300 returns.

Turning now to FIG. 4, a method 400 for increasing vehicle noise to notify the vehicle operator of a speed discrepancy in a vehicle operating at a set speed and operating semi-autonomously is shown. At 401, method 400 includes adjusting one or more actuators based on a commanded torque in order to maintain a set vehicle speed, a preceding vehicle distance, and/or other parameters. For example, during the semi-autonomous mode, the vehicle may be operated at or under a set vehicle speed (set by the operator or determined automatically from known or determined regional speed limits) and thus engine and/or wheel torque may be controlled according to a commanded torque commanded by the controller in the semi-autonomous mode. The commanded torque may be adjusted to maintain a predetermined following distance from a preceding vehicle, allow for maneuvering of the vehicle through corners, or other operations.

At 402, method 400 measures the current vehicle speed and at 404, method 400 compares the current vehicle speed with the user-input set speed. In one embodiment, if the current speed is not slower than the set speed, method 400 proceeds to 406. In one embodiment, if the current vehicle speed is within the speed tolerance of the set speed, method 400 proceeds to 406, where the vehicle does not increase vehicle noise but maintains semi-autonomous operation, which may include such features as adaptive cruise control with lane following and autobrake capabilities. The semi-autonomous operation of the vehicle continues to run unless specifically deactivated by the vehicle operator. Following 406, method 400 returns.

In one embodiment, if the current speed is slower than the set speed, method 400 proceeds to 408. In one embodiment, if the current vehicle speed is slower than the set speed and outside the speed tolerance of the set speed, method 400 proceeds to 408, where the vehicle maintains semi-autonomous operation. At 410, method 400 increases vehicle noise to notify the user that the vehicle is currently moving slower than the set speed. The vehicle may be moving slower than the set speed due to traffic congestion in the current lane where the vehicle is operating, for example. The vehicle noise may be increased by adjusting one or more drive unit actuators to increase vehicle noise while maintaining vehicle parameters, such as wheel torque and fuel economy, similar to the vehicle noise adjustments described above with respect to method 300. The increased vehicle noise notifies the vehicle operator of the vehicle moving at a speed lower than the set speed and allows the vehicle operator to take action, such as manually changing to a lane where there is less traffic congestion (and where the vehicle may continue at the previous set speed) or inputting a new slower set speed. Method 400 then returns.

Thus, methods 300 and 400 described above provide for modulating engine and/or other vehicle noise to notify an operator that a vehicle speed is outside a threshold range of a set or desired vehicle speed without relying on intrusive visual notifications. During driving, the operator's eyes may be over-utilized. However, the operator's hearing is often under-utilized. To utilize the operator's hearing as a mechanism for notifying the operator in a non-intrusive manner, the operator and controller determine a desired-communicated-speed (e.g., the set speed and speed tolerance range described above), and then as the vehicle speed increases toward the desired-communicated-speed, the engine tone may be adjusted to a different desirable sound, such as from normal to more throaty, by either adjusting engine intake/exhaust valve timing/lift, and/or by adjusting the interior noise cancelling speakers to create a different engine sound. The engine sound may begin to change at a certain speed relative to the desired speed limit, such as 3 MPH below the speed limit, and the engine noise may ramp in either linearly or asymptotically as the speed limit is approached, and then may step change, or increase more when the speed is reached or surpassed. The sound vs. speed is fully calibratable by the vehicle manufacturer and/or operator. The operator activates/deactivates the human-in-the-loop control, and may be able to select more/less sound, and more/less vehicle speed sensitivity.

In this way, as the vehicle speed increases and decreases near the desired-communicated-speed the operator is able to detect the changing frequency and magnitude of the engine sound. Similarly, the above steps could be integrated with GPS-based and camera-based speed-limit-identification systems, where the increase in engine sound is coordinated with the detected speed limits, e.g., when the controller receives information that the speed limit has decreased by 5 MPH, the controller reduces the desired-communicated-speed by 5 MPH.

In still further examples, output from one or more sound-detecting devices in the vehicle cabin may be used as feedback to modulate the amount of engine and/or vehicle noise that is generated. The in-cabin microphone 27 may measure the ambient noise level inside the vehicle cabin and send this information to the vehicle control system 28. This engine control system may use the in-cabin microphone data to determine an ambient cabin noise baseline, which may be determined before any increases to vehicle noise are made. When the vehicle control system adjusts one or more engine or vehicle actuators to increase vehicle noise, the in-cabin microphone may allow the engine control system to detect if a change in the detected noise level compared to the ambient baseline occurs. This may be beneficial since at different cabin ambient noise levels, specific engine system actuation adjustments to increase vehicle noise may be less effective and go unnoticed by the vehicle operator. In still further examples, the sound detected by the microphone may be used as feedback in a control loop that adjusts the vehicle noise responsive to vehicle speed meeting a predetermined condition relative to a threshold speed (e.g., responsive to vehicle speed exceeding a an operator-set maximum vehicle speed). As adjustments are made to the vehicle drive unit actuators to increase vehicle noise (e.g., as the intake throttle is opened to increase engine noise), the sound levels in the vehicle cabin may be measured by the microphone. The level of adjustment of the drive unit actuators (e.g., the intake throttle) may be adjusted based on the output from the microphone. For example, the intake throttle may be opened until a threshold change in cabin noise is detected by the microphone. Turning now to FIG. 5, an example timeline operation map 500 of vehicle 102 with engine system 100 and human-in-the-loop cruise control is shown. The map 500 of FIG. 5 shows a vehicle speed plot at 502, an operator-requested engine torque plot at 510 and a delivered engine torque plot at 511, a cruise control status plot at 512, which includes both standard cruise control and human-in-the-loop (HITL) cruise control, a throttle position plot at 514, and an intake valve timing plot at 516. All plots are depicted over time along the x-axis. In addition, the magnitude of a parameter represented in any given plot increases along the y-axis going from bottom to top, as shown. The exception to this is the intake valve timing plot, where the y-axis corresponds to the intake valve closing timing and progresses from an advanced (e.g., earlier) timing at the bottom to a retarded (e.g., later) timing at the top. Time markers t1-t5 depict times where significant events occur.

Prior to time t1, the vehicle is operating with standard cruise control (plot 512), where vehicle speed is controlled automatically (e.g., without explicit input from the operator) such that vehicle speed is maintained within a range of a set speed (shown by set speed 504). The vehicle initially accelerates to reach the set speed (shown by plot 502) until the vehicle reaches the set speed. To accelerate the vehicle, engine toque is commanded to increase (plot 510 shows that commanded torque is higher than delivered torque). During this time period, throttle position is at a relatively open position (plot 514). The intake valve timing is more advanced (plot 516). As a result, the delivered engine torque (plot 511) increases. Before time t1, the vehicle speed reaches the set speed, and thus engine torque stabilizes. As an increase in engine torque is not commanded, the throttle may be moved to a more closed position and intake valve timing may be moved to a less advanced timing.

At time t1, the operator disables cruise control and maintains operation of the vehicle at a steady speed. Engine torque, throttle position, and intake valve timing may be maintained at current levels. At time t2, the vehicle operator activates the human-in-the-loop cruise control (shown by plot 512). The vehicle operator may input the same set vehicle speed 504 and a set speed tolerance may be determined by engine control system 28 (e.g., based on an operator designated speed tolerance) that may include vehicle speeds between an upper limit 506 and a lower limit 508 (e.g., vehicle speeds between lower limit 508 and upper limit 506 may be within a predetermined range of the set speed). Between times t2 and t3, the vehicle speed (plot 502) slowly increases to the upper limit 506, both the commanded and delivered engine torque increase. As shown, the throttle position and intake valve timing remain relatively constant.

After time t3, the vehicle speed (plot 502) increases above the upper limit 506 and continues to increase, due to an increase in the commanded torque (where during the human-in-the-loop cruise control mode, the commanded torque represents the operator-desired torque). The intake throttle may start to open to increase the engine torque.

In response to the increase in vehicle speed above the upper limit, the engine control system 28 adjusts both intake valve timing (plot 516) and throttle position (plot 514) to increase vehicle noise to notify the vehicle operator that the vehicle speed is outside the set input speed tolerance. As illustrated, the intake throttle position may be adjusted to a more open position (e.g., to wide open throttle) to increase vehicle noise, and the intake valve timing may be retarded to open and close the intake valves at a later timing. The throttle may be adjusted to a position that is more open than needed for the commanded engine torque, in order to generate the vehicle noise. However, as shown by plots 510 and 511, engine torque remains within a threshold of the commanded torque, despite the opening of the throttle, due to the adjustment of the intake valve timing.

In the example illustrated in FIG. 5, the intake throttle position and intake valve timing adjustments may occur for a relatively short predetermined amount of time, such as two seconds. After the predetermined time has elapsed, both the throttle and intake valve timing return to previous states before t4, which ends the increased vehicle noise notification. The vehicle operator notices the increased vehicle noise notification and begins to adjust the speed of the vehicle at time t4.

After time t4, the vehicle speed (plot 502) decreases until it is below the upper limit 506 at time t5. The decrease in vehicle speed may occur when the vehicle operator responds to the vehicle noise notification that the speed is outside the set speed tolerance. The engine torque (plot 511) also decreases while the throttle positon (plot 514) continues to move toward a more closed position and intake valve timing (plot 516) remains constant.

After time t5, the vehicle is moving at a speed between the lower limit 508 and the upper limit 506, which is within the set input speed tolerance. The vehicle proceeds to operate with the human-in-the-loop cruise control (plot 512) on and the vehicle reaches the set speed 504 again. The engine torque (plot 510) remains constant, along with the throttle position and the intake valve timing.

FIG. 6 illustrates an example timeline operation map 600 of vehicle 102 with engine system 100 and a semi-autonomous driving mode with vehicle noise speed discrepancy notification. The map 600 of FIG. 6 shows a vehicle speed plot at 602, an engine torque plot at 608, a semi-autonomous driving mode status plot at 610, a throttle position plot at 612, and an intake valve timing plot at 614. All plots are depicted over time along the x-axis. In addition, the magnitude of a parameter represented in any given plot increases along the y-axis going from bottom to top, as shown. The exception to this is the intake valve timing plot, where the y-axis corresponds to the intake valve closing timing that progresses from a more advanced timing to a more retarded timing. Time markers t1-t4 depict times where significant events occur.

Prior to time t1, the vehicle is increasing in speed (shown by plot 602) until the speed reaches a near steady speed, which may occur when initially entering a highway from a long onramp. During this time period, the engine torque (shown by plot 608) increases and the semi-autonomous mode (shown by plot 610) has not been activated. The throttle position (shown by plot 612) may also be adjusted to a more open position to increase the engine torque, but then may return to a partially closed position. The intake valve timing (shown by plot 614) is also constant and at a timing for best fuel economy, for example.

At time t1, the vehicle operator activates the semi-autonomous mode (plot 610). The vehicle operator may input a set (e.g., target) vehicle speed 604 and a set input speed tolerance may be determined by engine control system 28 (e.g., based on an operator designated speed tolerance) that may include a lower limit speed 606. Between times t1 and t2, the vehicle speed (plot 602) stays roughly constant at the set speed 604, but begins to decrease as time t2 is approached. The engine torque, throttle position, and intake valve timing remain relatively constant.

At time t2, the vehicle speed (plot 602) drops below the lower limit speed 606. This decrease in vehicle speed may occur when traffic congestion is encountered and the vehicle slows down. To notify the vehicle operator, the engine control system 28 moves the throttle to a more open position (plot 612) and retards the intake valve timing (plot 614) for a relatively short time, such as two seconds, which increases vehicle noise to notify the vehicle operator. The throttle position and intake valve timing return to previous levels prior to time t3. While engine torque may decrease when the vehicle speed decreases, the engine torque does not change appreciably responsive to the opening of the intake throttle, due to the compensating adjusting to the intake valve timing.

At time t3, the vehicle speed begins to increase. This increase in vehicle speed may occur after the vehicle operator makes a lane change while the vehicle is in semi-autonomous mode to circumvent the traffic congestion and allow the vehicle speed to increase within the set input speed tolerance. The engine torque (plot 608) increases while the throttle position changes to a more open position and intake valve timing stays constant.

At time t4, the vehicle speed (plot 602) reaches the lower limit speed 606. The vehicle proceeds operating semi-autonomously (plot 610) and the vehicle speed reaches the set speed 604. The engine torque (plot 608) remains constant, along with the throttle position (plot 612) and the intake valve timing (plot 614).

Thus, the methods and systems described herein provide for modulation of vehicle noise in order to notify a driver of an impending or occurring speed error between an actual speed of a vehicle and a set or desired speed. This allows for a non-intrusive notification of vehicle speed error for the driver, which allows the driver to be less distracted by visual indicators or alarm chimes and more engaged with operating the vehicle. Increased driver engagement with vehicle operation, while being more enjoyable for the vehicle driver, may also enhance driver safety due to decreased distractions.

The technical effect of adjusting vehicle noise to indicate to a vehicle operator of a speed error is that it is a non-intrusive notification method, which allows the vehicle operator to know how far the current vehicle speed is from the set or desired vehicle speed and make appropriate adjustments with reduced distractions.

An example provides a method for a drive unit of a vehicle, the method including responsive to a vehicle speed meeting a predefined condition relative to a threshold vehicle speed, adjusting one or more drive unit actuators to modulate noise while maintaining desired wheel torque within a threshold. In a first example of this method, the drive unit comprises an engine, the one or more drive unit actuators comprise one or more engine actuators, and wherein adjusting one or more drive unit actuators to modulate noise while maintaining desired wheel torque within the threshold comprises adjusting a position of a throttle valve positioned in an intake of the engine to increase engine noise while retarding intake valve timing to maintain wheel desired torque within the threshold, and the method further comprising adjusting engine torque independent of the vehicle speed meeting the predefined condition relative to the threshold vehicle speed. In a second example, which optionally includes the first example, adjusting one or more drive unit actuators to modulate noise while maintaining desired wheel torque within a threshold comprises adjusting a transmission gear ratio to increase engine noise while adjusting one or more of boost pressure, spark timing, and intake throttle position to maintain desired wheel torque within the threshold. In a third example, which optionally includes one or both of the first and second examples, desired wheel torque comprises an operator-requested torque during a human-in-the-loop cruise mode of operation, or a system-commanded torque during a semi-autonomous mode of operation. In a fourth example, which optionally includes one or more or each of the first through third examples, vehicle speed meeting the predefined condition relative to the threshold vehicle speed comprises vehicle speed being equal to or above an operator-set desired vehicle speed, wherein adjusting one or more drive unit actuators to modulate noise while maintaining desired wheel torque within a threshold comprises adjusting one or more drive unit actuators to increase noise to a first level, and further comprising responsive to vehicle speed being below the desired vehicle speed by less than a threshold amount, adjusting the one or more drive unit actuators to increase noise to a second level, less than the first level, and as vehicle speed increases toward the desired speed, adjusting the one or more drive actuators to increase the noise toward the first level. In a fifth example, which optionally includes one or more of each of the first through fourth examples, vehicle speed meeting the predefined condition relative to the threshold vehicle speed comprises vehicle speed being equal to or below the threshold vehicle speed for a duration, the threshold vehicle speed based on an operator-set maximum vehicle speed. In a sixth example, which optionally includes one or more of each of the first through fifth examples, the method further includes, responsive to the vehicle speed meeting the predefined condition relative to the threshold vehicle speed, adjusting cabin noise cancellation. In a seventh example, which optionally includes one or more of each of the first through sixth examples, the method further includes upon adjusting the one or more drive unit actuators to modulate noise while maintaining desired wheel torque within the threshold and responsive to a threshold amount of time having elapsed, adjusting the one or more drive unit actuators back to a prior state to cease the modulation of the noise. In an eighth example, which optionally includes one or more of each of the first through seventh examples, the method further includes, upon adjusting the one or more drive unit actuators to modulate noise while maintaining desired wheel torque within the threshold and responsive to vehicle speed meeting another predefined condition relative to the threshold vehicle speed, adjusting the one or more drive unit actuators back to a prior state to cease the modulation of the noise.

Another example provides a hybrid vehicle system including a controller storing instructions in non-transitory memory executable to, responsive to a speed of a vehicle of the hybrid vehicle system meeting a predefined condition relative to a threshold vehicle speed, adjust one or more actuators to modulate vehicle noise while maintaining desired wheel torque within a threshold, including: during an electric mode where the vehicle is propelled by an electric machine, adjust an amount of noise output from the electric machine to increase vehicle noise; and during an engine mode where the vehicle is propelled by an engine, adjust a position of an intake throttle coupled upstream of the engine to increase vehicle noise. In a first example of the system, the engine includes a plurality of cylinders, each cylinder including an intake valve, and wherein the instructions are further executable to adjust intake valve timing responsive to the adjustment of the position of the intake throttle to maintain desired wheel torque. In a second example, which optionally includes the first example, the instructions are executable to, when operating the vehicle in a semi-autonomous mode, adjust the one or more actuators to modulate vehicle noise while maintaining desired wheel torque within the threshold responsive to the speed of the vehicle being below the threshold speed for a threshold duration, where the desired wheel torque is a commanded torque commanded by the controller. In a third example, which optionally includes one or both of the first and second examples, the instructions are executable to, when operating the vehicle in a human-in-the-loop cruise mode, adjust the one or more actuators to modulate vehicle noise while maintaining desired wheel torque within the threshold responsive to the speed of the vehicle being above the threshold speed, where the desired wheel torque is an operator-desired torque. In a fourth example, which optionally includes one or more or each of the first through third examples, the system further includes a microphone configured to detect vehicle noise, and wherein the instructions are executable to adjust one or more actuators to modulate vehicle noise based on output from the microphone. In a fifth example, which optionally includes one or more or each of the first through fourth examples, the instructions are executable to, during a hybrid mode where the vehicle is propelled by one or more of the engine and the electric machine, concurrently adjust the position of the intake throttle and adjust the amount of noise output from the electric machine to increase vehicle noise, wherein the amount of noise output by the electric machine is adjusted by adjusting a torque and/or speed of the electric machine.

Another example provides a method for an engine of a vehicle, comprising while operating in a human-in-the-loop mode and responsive to a speed of the vehicle exceeding a threshold speed, opening a throttle valve positioned in an intake of the engine to increase engine noise while also retarding intake valve timing to maintain operator desired torque within a threshold. In a first example of the method, the threshold speed is based on an operator-set maximum speed and the method further includes responsive to a request to operate in a cruise control mode, adjusting one or more engine actuators based on a commanded torque to maintain the speed of the vehicle within a threshold range of the operator-set maximum speed. In a second example of the method, which optionally includes the first example, adjusting one or more engine actuators to maintain the speed of the vehicle within the threshold range of the operator-set maximum speed comprises opening the throttle valve and advancing intake valve timing to increase torque responsive to the speed of the vehicle being below the operator-set maximum speed. In a third example of the method, which optionally includes one or both of the first and second examples, retarding intake valve timing comprises retarding intake valve timing away from a set intake valve timing, the set intake valve timing based on the operator requested torque. In a fourth example of the method, which optionally includes one or more or each of the first through third examples, opening the throttle valve comprises moving the throttle valve to a more open position relative to a set throttle valve position, the set throttle valve position based on the operator requested torque.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a drive unit of a vehicle, comprising:
responsive to a vehicle speed meeting a predefined condition relative to a threshold vehicle speed, and after meeting the predefined condition then followed by a speed change outside of the threshold vehicle speed, notifying a vehicle operator of vehicle speed changes by adjusting one or more drive unit actuators to modulate noise while maintaining desired wheel torque within a threshold.

2. The method of claim 1, wherein the drive unit comprises an engine, the one or more drive unit actuators comprise one or more engine actuators, and wherein adjusting one or more drive unit actuators to modulate noise while maintaining desired wheel torque within the threshold comprises adjusting a position of a throttle valve positioned in an intake of the engine to increase engine noise while retarding intake valve timing to maintain wheel desired torque within the threshold, and further comprising adjusting engine torque independent of the vehicle speed meeting the predefined condition relative to the threshold vehicle speed.

3. The method of claim 2, wherein adjusting one or more drive unit actuators to modulate noise while maintaining desired wheel torque within the threshold comprises adjusting a transmission gear ratio to increase engine noise while adjusting one or more of boost pressure, spark timing, and intake throttle position to maintain desired wheel torque within the threshold.

4. The method of claim 1, wherein the desired wheel torque comprises an operator-requested torque during a human-in-the-loop cruise mode of operation, or a system-commanded torque during a semi-autonomous mode of operation.

5. The method of claim 1, wherein vehicle speed meeting the predefined condition relative to the threshold vehicle speed comprises vehicle speed being equal to or above an operator-set desired vehicle speed, wherein adjusting one or more drive unit actuators to modulate noise while maintaining desired wheel torque within the threshold comprises adjusting one or more drive unit actuators to increase noise to a first level, and further comprising responsive to vehicle speed being below the desired vehicle speed by less than a threshold amount, adjusting the one or more drive unit actuators to increase noise to a second level, less than the first level, and as vehicle speed increases toward the desired speed, adjusting the one or more drive actuators to increase the noise toward the first level.

6. The method of claim 1, wherein vehicle speed meeting the predefined condition relative to the threshold vehicle speed comprises vehicle speed being equal to or below the threshold vehicle speed for a duration, the threshold vehicle speed based on an operator-set maximum vehicle speed.

7. The method of claim 1, further comprising responsive to the vehicle speed meeting the predefined condition relative to the threshold vehicle speed, adjusting cabin noise cancellation.

8. The method of claim 1, further comprising, upon adjusting the one or more drive unit actuators to modulate noise while maintaining desired wheel torque within the threshold and responsive to a threshold amount of time having elapsed, adjusting the one or more drive unit actuators back to a prior state to cease the modulation of the noise.

9. The method of claim 1, further comprising, upon adjusting the one or more drive unit actuators to modulate noise while maintaining desired wheel torque within the threshold and responsive to vehicle speed meeting another predefined condition relative to the threshold vehicle speed, adjusting the one or more drive unit actuators back to a prior state to cease the modulation of the noise.

10. A hybrid vehicle system, comprising:
a controller storing instructions in non-transitory memory executable to:
responsive to a speed of a vehicle of the hybrid vehicle system meeting a predefined condition relative to a threshold vehicle speed, adjust one or more actuators to modulate vehicle noise while maintaining desired wheel torque within a threshold, including:
during an electric mode where the vehicle is propelled by an electric machine, adjust an amount of noise output from the electric machine to increase vehicle noise; and
during an engine mode where the vehicle is propelled by an engine, adjust a position of an intake throttle coupled upstream of the engine to increase vehicle noise.

11. The hybrid vehicle system of claim 10, wherein the engine includes a plurality of cylinders, each cylinder including an intake valve, and wherein the instructions are further executable to adjust intake valve timing responsive to the adjustment of the position of the intake throttle to maintain desired wheel torque.

12. The hybrid vehicle system of claim 10, wherein the instructions are executable to, when operating the vehicle in a semi-autonomous mode, adjust the one or more actuators to modulate vehicle noise while maintaining desired wheel torque within the threshold responsive to the speed of the vehicle being below the threshold speed for a threshold duration, where the desired wheel torque is a commanded torque commanded by the controller.

13. The hybrid vehicle system of claim 10, wherein the instructions are executable to, when operating the vehicle in a human-in-the-loop cruise mode, adjust the one or more actuators to modulate vehicle noise while maintaining desired wheel torque within the threshold responsive to the speed of the vehicle being above the threshold speed, where the desired wheel torque is an operator-desired torque.

14. The hybrid vehicle system of claim 10, further comprising a microphone configured to detect vehicle noise, and wherein the instructions are executable to adjust one or more actuators to modulate vehicle noise based on output from the microphone.

15. The hybrid vehicle system of claim 10, wherein the instructions are executable to, during a hybrid mode where the vehicle is propelled by one or more of the engine and the electric machine, concurrently adjust the position of the intake throttle and adjust the amount of noise output from the electric machine to increase vehicle noise, wherein the amount of noise output by the electric machine is adjusted by adjusting a torque and/or speed of the electric machine.

16. A method for an engine of a vehicle, comprising:
while operating in a human-in-the-loop mode and responsive to a speed of the vehicle exceeding a threshold speed, opening a throttle valve positioned in an intake of the engine to increase engine noise while also retarding intake valve timing to maintain operator desired torque within a threshold.

17. The method of claim 16, wherein the threshold speed is based on an operator-set maximum speed and further comprising responsive to a request to operate in a cruise control mode, adjusting one or more engine actuators based on a commanded torque to maintain the speed of the vehicle within a threshold range of the operator-set maximum speed.

18. The method of claim 17, wherein adjusting one or more engine actuators to maintain the speed of the vehicle within the threshold range of the operator-set maximum speed comprises opening the throttle valve and advancing intake valve timing to increase torque responsive to the speed of the vehicle being below the operator-set maximum speed.

19. The method of claim 16, wherein retarding intake valve timing comprises retarding intake valve timing away from a set intake valve timing, the set intake valve timing based on the operator requested torque.

20. The method of claim 16, wherein opening the throttle valve comprises moving the throttle valve to a more open position relative to a set throttle valve position, the set throttle valve position based on the operator requested torque.

\* \* \* \* \*